United States Patent [19]

Ciocan

[11] 4,219,229
[45] Aug. 26, 1980

[54] REMOVABLE STANCHION FOR CARGO BRACING PURPOSES
[75] Inventor: Benjamin Ciocan, Warren, Mich.
[73] Assignee: The United States of America as represented by the Secretary of the Army, Washington, D.C.
[21] Appl. No.: 30,184
[22] Filed: Apr. 16, 1979
[51] Int. Cl.³ .............................................. B60P 7/06
[52] U.S. Cl. ..................................... 296/43; 105/384; 410/97; 410/101; 410/121; 410/140
[58] Field of Search ....................... 296/43; 410/35, 39, 410/49, 68, 77, 82, 97, 101, 108, 115, 116, 121, 140, 155; 105/380, 384

[56] References Cited
U.S. PATENT DOCUMENTS 3,715,993  2/1973  Orlik ........................................ 410/49
4,139,228  2/1979  Varadi ...................................... 410/82

Primary Examiner—John J. Love
Assistant Examiner—John A. Carroll
Attorney, Agent, or Firm—Peter A. Taucher; John E. McRae; Nathan Edelberg

[57] ABSTRACT

A cargo bed having an indeterminate number of upright stanchions mounted thereon to engage side surfaces of cargo components supported on the bed surface. Each stanchion includes a laterally-extending finger that registers with a slot in the bed wall. By rotating the stanchion about its axis it is possible to orient the finger crosswise of the slot, thereby locking the stanchion to the bed. The stanchion may be removed by twisting the stanchion to a position in which the finger registers with the slot.

2 Claims, 7 Drawing Figures

U.S. Patent   Aug. 26, 1980   4,219,229
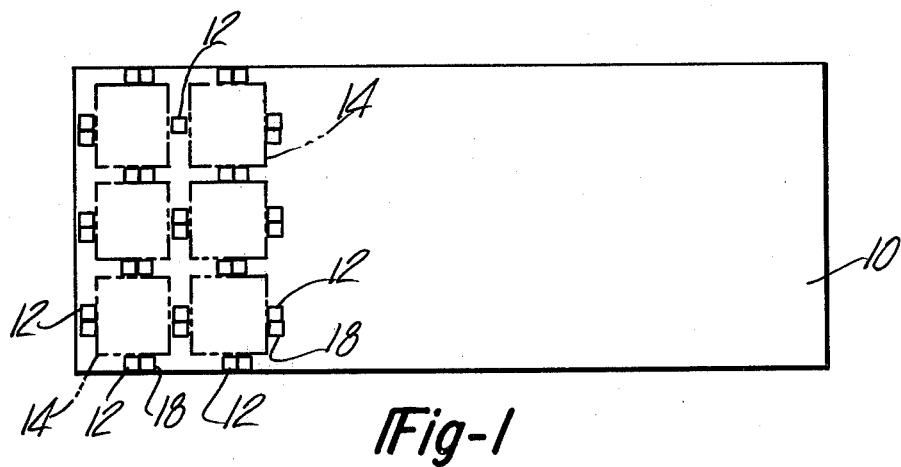
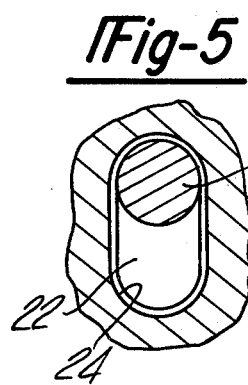
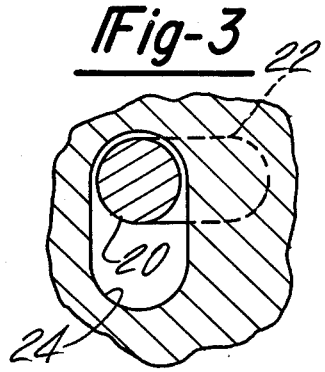
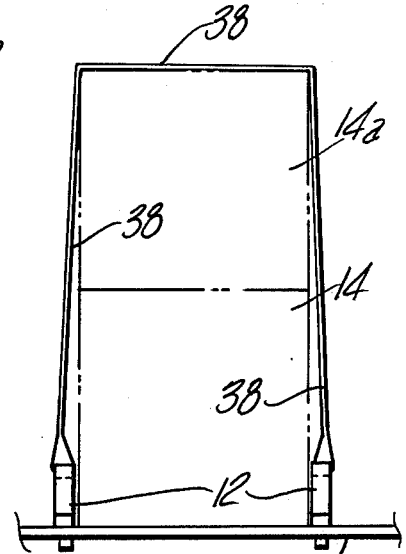
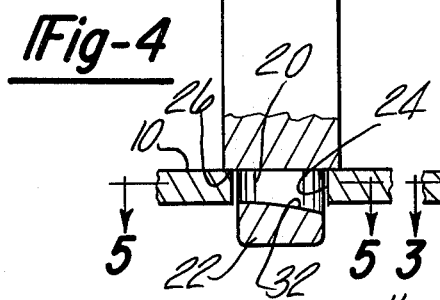
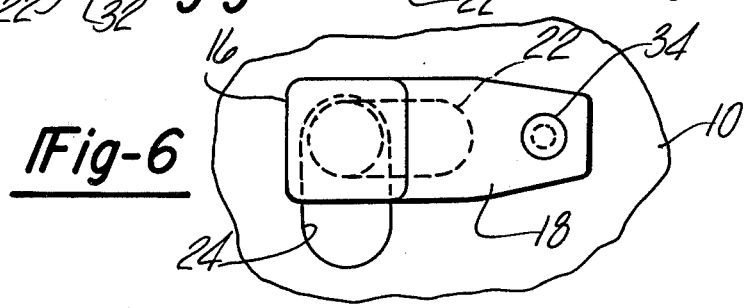

REMOVABLE STANCHION FOR CARGO BRACING PURPOSES

BACKGROUND AND SUMMARY OF THE INVENTION

This invention relates to cargo-bracing mechanisms constructed as stanchions removably mounted on cargo bed areas in vehicles such as trucks, flat bed trailers, or railroad flat cars. In carrying out the invention I provide slots at regularly spaced points along the cargo bed surface. As cargo components are moved onto the bed stanchions are inserted into those slots that are located nearest the side surfaces of the cargo components. The stanchions project upwardly from the bed surface to minimize lateral shift of the cargo components. The invention is applicable to the bracing of various types of cargo components on bed surfaces, as for example pallets, bins, racks, boxes, crates, cartons, drums, coils, etc.

The invention provides a stanchion construction that minimizes tie-down requirements, that subtracts very little from the usable cargo bed area, that is easily installed or removed from the bed, that enjoys a rigid connection with the bed, and that requires only minor alteration of the bed for use thereon. The closest known prior art patents are U.S. Pat. No. 1,973,624 to Hanlon and U.S. Pat. No. 3,377,039 to Hayes.

The invention described herein may be manufactured, used, and licensed by or for the Government for governmental purposes without payment to me of any royalty thereon.

THE DRAWINGS

FIG. 1 is a top plan view of a vehicle cargo bed having stanchions thereon for preventing lateral shift of cargo components resting on the bed surface. The cargo components are shown in phantom.

FIG. 2 is an elevational view of a stanchion structure embodying my invention.

FIG. 3 is a fragmentary sectional view taken on line 3—3 in FIG. 2.

FIG. 4 is a view similar to FIG. 2 but showing the stanchion in a rotated position partially disassembled from the cargo bed.

FIG. 5 is a fragmentary sectional view taken on line 5—5 in FIG. 4.

FIG. 6 is a top plan view of the FIG. 2 stanchion.

FIG. 7 is an elevational view of two stanchions utilized as anchorages for a cargo tie-down strap or band.

Referring in greater detail to FIG. 1, there is shown in top plan view a rectangular cargo deck or bed 10 having a number of upright post-like stanchions 12 located in near adjacency to the side surfaces of freight components 14. Such freight components can take various forms such as boxes, crates, cartons, pallets, racks, bins, etc. The stanchions are sequentially installed on bed 10 after each freight component or group of freight components is/are loaded onto the bed. In an optimum system the process of installing the stanchions does not add appreciably to the cargo-loading time. During transit periods stanchions 12 act as braces or posts to prevent or minimize lateral shift of freight components 14, thereby reducing damage to the freight during stop-and-go movement of the vehicle. In some cases the stanchions eliminate the need for straps, chains, bands or similar tie-down devices. The structure of an individual stanchion is shown in FIGS. 2 through 6.

As shown in FIG. 2, the stanchion 12 includes a post 16 having a laterally extending foot 18 at its lower end. Projecting downwardly from the post is a circular pin 20 that connects with a cam lock finger 22. The plan outline of finger 22 conforms to the dimension of a slot 24 in the bed or floor 10. Therefore, when the stanchion is held in such a position that finger 22 mates with slot 24 the stanchion can be lowered so that the finger moves downwardly through slot 24 to the position shown in FIG. 4. The lower surface 26 of foot 18 engages the upper surface of bed 10 to limit downward movement of the stanchion.

With the stanchion located in the FIG. 4 position the stanchion can be manually rotated counterclockwise approximately ninety degrees around the vertical axis 30 defined by post 16; finger 22 is thereby moved to a position extending crosswise of slot 24, as shown in FIG. 6. FIGS. 2, 3 and 6 illustrate the stanchion in its locked position secured in place on bed 10. The stanchion may be prevented from inadvertant turning or dislodgement back to the FIG. 4 partially disassembled condition by either of two mechanisms or features. One securement mechanism comprises a small pin 34 that may be spring loaded. The pin is projectible or insertable through aligned holes in foot 18 and bed 10. The hole in bed 10 is strategically located so that the two holes align with each other when foot 18 reaches the FIG. 6 position, or provides a friction stop on the surface of the bed. An additional securement action may be achieved by forming the upper surface of finger 22 as a cam surface 32 acutely angled to the flat lower face 26 of foot 18. As seen in FIG. 4, cam surface 32 angles upwardly from right to left. Therefore, as the stanchion is turned counterclockwise (left to right in FIG. 4) the cam surface exerts a progressively increasing force on the lower face of bed 10. The minimum spacing between cam surface 32 and surface 26 is slightly less than the thickness of the bed wall 10 so that the bed wall is wedged tightly between the foot and finger when the stanchion is in its FIG. 6 installed position. Movement of the stanchion to the FIG. 6 position can be accomplished by wrench action on post 16 and/or a lateral hammer action on foot 18. It is not necessary to perform any operations in the space beneath bed 10.

The post portion 16 of the stanchion can be of any convenient height, sufficient only to engage a sufficient area of the cargo component to prevent undesired shifting movements; in most cases a post height of about six inches is sufficient. Preferably the post has a flat-sided cross section, as shown in FIG. 6, to maximize the area of contact between the post and cargo component.

It is contemplated that the various slots 24 will be spaced in accordance with the expected dimensions of the cargo components. If desired, bed 10 can be formed of steel sheets having a pattern of slots 24 pre-formed therein; the slot spacing can be less than the expected cargo component dimensions, in which case not all of the slots will be used. Slots 24 can be formed in the beds of existing vehicles on a retrofit basis. The slots can be of any convenient length in the major dimension (or axis); for extreme adjustability the slots can be elongated to provide tracks running lengthwise or laterally along the bed.

In those cases where it is necessary to provide tie-downs for the cargo then stanchions 12 can serve as anchorages for the conventional tie-down straps or bands. For this purpose each stanchion can be provided with a slot 36 or hole located near the upper end of its post 16. As best visualized from FIG. 7, the slots in different stanchions serve as anchorages for bands 38 tensioned over stacked cargo components 14 and 14a.

I wish it to be understood that I do not desire to be limited to the exact details of construction shown and described for obvious modifications will occur to a person skilled in the art.

I claim:

1. In a vehicle having a bed for receiving cargo thereon: improved means for minimizing lateral shift of the cargo along the bed upper surface; said shift-minimizing means comprising a number of stanchions removably mounted on the bed to extend closely adjacent side surfaces of cargo components; said bed having a series of slots therethrough; each slot having a major axis and a minor axis; each stanchion comprising a post, a foot extending laterally from the post for a significantly greater distance than the minor dimension of the slot, a pin projecting downwardly from the post, and a finger projecting laterally from the pin in spaced relation to the foot; each finger having a plan outline mated to the configuration of the slot whereby the post can be manipulated to cause the pin and finger to penetrate the slot, whereupon the finger takes a position below the plane of the bed and the pin takes a position within the slot; the aforementioned foot having a flat lower face adapted to abut against the bed upper surface when the pin is within the slot; the stanchion being rotatably adjustable about the axis of the post so that the finger can take a locking position generally at right angles to the slot; the axial dimension of the pin corresponding to the thickness of the bed, whereby the finger and foot forcibly engage opposite surfaces of the bed, thereby stabilizing the stanchion in an upright condition projecting upwardly from the bed upper surface.

2. The improvement of claim 1 wherein the upper surface of the finger extends at an acute angle to the plane of the foot lower surface, whereby during rotatable adjustment of the stanchion the finger upper surface cams against the bed lower surface; the minimum spacing between the upper surface of the finger and the lower surface of the foot being slightly less than the thickness of the bed, whereby the bed is wedged tightly between the foot and finger when the finger reaches a locking position at right angles to the slot.

* * * * *